United States Patent
Kwak et al.

(10) Patent No.: US 12,549,263 B2
(45) Date of Patent: Feb. 10, 2026

(54) METHOD AND APPARATUS FOR CALIBRATING ARRAY PATH OF BEAM FORMING TEST EQUIPMENT FOR BASE STATION

(71) Applicant: INNOWIRELESS CO., LTD., Seongnam-si (KR)

(72) Inventors: Young Su Kwak, Suwon-si (KR); Yong Hoon Lim, Seoul (KR); Il Doo Chang, Anyang-si (KR); Jong Pil Seo, Incheon (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 314 days.

(21) Appl. No.: 18/212,363

(22) Filed: Jun. 21, 2023

(65) Prior Publication Data

US 2023/0421270 A1    Dec. 28, 2023

(30) Foreign Application Priority Data

Jun. 22, 2022   (KR) .......................... 10-2022-0076024

(51) Int. Cl.
| | | |
|---|---|---|
| *H04B 17/11* | (2015.01) | |
| *G01R 29/08* | (2006.01) | |
| *G01R 29/10* | (2006.01) | |
| *H04B 17/309* | (2015.01) | |

(52) U.S. Cl.
CPC ......... *H04B 17/11* (2015.01); *G01R 29/0892* (2013.01); *G01R 29/10* (2013.01); *H04B 17/309* (2015.01)

(58) Field of Classification Search
CPC .. H04B 17/11; H04B 17/309; G01R 29/0892; G01R 29/10
USPC ....................................... 455/67.13
See application file for complete search history.

(56) References Cited

U.S. PATENT DOCUMENTS 10,684,318 B1 *   6/2020   Kyrolainen .......... G01R 29/105

FOREIGN PATENT DOCUMENTS

| KR | 10-1286023 B1 | 7/2013 |
|---|---|---|
| KR | 10-1606354 B1 | 3/2016 |
| KR | 10-2003877 B1 | 7/2019 |
| KR | 10-2158149 A | 5/2020 |
| KR | 10-2021-0089900 A | 7/2021 |

* cited by examiner

*Primary Examiner* — Michael R Neff
(74) *Attorney, Agent, or Firm* — Kaplan Breyer Schwarz, LLP

(57) ABSTRACT

A method and an apparatus for calibrating an array path of a beam forming test equipment for a base station, includes enabling a beam forming-related interlocking test of a base station and a test equipment by compensating for distortion of the beam forming characteristics of the base station incidentally caused by the connection between the base station and the test equipment by using a specific signal transmitted from the base station, when test equipment such as a channel simulator is used to test beam forming of a base station.

6 Claims, 6 Drawing Sheets

METHOD AND APPARATUS FOR CALIBRATING ARRAY PATH OF BEAM FORMING TEST EQUIPMENT FOR BASE STATION

CROSS-REFERENCE TO RELATED APPLICATION

This application claims priority to and the benefit of Korean Patent Application No. 10-2022-0076024, filed on Jun. 22, 2022, the disclosure of which is incorporated herein by reference in its entirety.

FIELD

The present disclosure relates to a method and an apparatus for calibrating an array path of a beam forming test equipment for a base station which compensate for the beam forming characteristic distortion of the base station incidentally caused due to the connection between the base station and the test equipment during a base station beam forming test using a specific signal transmitted from the base station.

BACKGROUND

FIG. 1 is a diagram for explaining a calibration process of a base station employing a conventional beam forming technique. As shown in FIG. 1, in 5 generation (5G) new radio (NR), the digital data processing unit (digital unit; DU) 110 of the base station 100 is separated to collect and manage several DUs 110 in one place, and the base station 100 adopts, for example, a cloud radio access network (C-RAN) that uses a CPRI (Common Public Radio Interface) as a fronthaul connecting the DU 110 and the radio signal processor (RU; Radio Unit) 120 in a state in which only the RU 120 is installed.

Meanwhile, the biggest feature of 5G mobile communication technology is a beam forming-based massive multiple-input and multiple-output (MIMO) technology (hereinafter simply referred to as 'beam forming' technology) that operates with a plurality of directional beams using an array antenna 122 and what is essential in the beam forming technology is to match the amplitude and phase characteristics of the beam forming coefficient and the circuit between the antenna 122, for example, the RF circuit such as the DAC/RF (digital to analogue converter/radio frequency) amplifier 121 and wiring/cable, for each antenna path. To this end, in the DU 110 of the base station, a calibration process of measuring and compensating the characteristics of the (A) path passing through the RU 120 to each antenna 122, that is, wiring/cables connecting the DU 110 and the DAC/RF amplifier 121, and the DAC/RF amplifier 121 and the antenna 122 in FIG. 1, and the path ((1)-(2)-(3) path) to the antenna 122 is performed.

In contrast, when a beam forming-based base station is tested or a beam forming test is performed using a beam forming-based base station, the (B) path between the array antenna port 123 of the base station and the beam forming test equipment 200, that is, the wiring/cable connecting DU 110 and DAC/RF amplifier 121, DAC/RF amplifier 121 and array antenna port 123, array antenna port 123 and test equipment 200 in FIG. 1, for example, the path ((1)-(2)-(4)-(5) path) between the RF input ports 201 of the channel simulator of the related arts 1 to 4, which is the invention in the related of the present applicant described later, is connected by wire. However, since an RF circuit (not shown) such as a splitter for distributing signals passed through the DAC/RF amplifier 121 in the RU 120 to the array antenna 122 and the array antenna port 123 and a cable 124 connecting the array antenna port 123 and the input port 201 of the test equipment 200 and the like are not included in the calibration target of the base station, if the amplitude and phase characteristics of each RF circuit and cable are different, distortion occurs in the beam pattern formed by the base station.

To compensate for this, RF components on each array antenna path may be measured and compensated with a network analyzer, and the like, but there was a concern in that the accuracy of compensation is highly likely to be deteriorated due to changes in amplitude and phase characteristics during the process of detaching and attaching the cable for measurement.

Literature in the Related Art

Literature 1 in related art: Registered Patent Publication No. 10-1286023 (Title of Invention: Channel Simulator)
Literature 2 in related art: Registered Patent Publication No. 10-2003877 (Title of Invention: Channel Emulator for Massive MIMO of Beam Space Method)
Literature 3 in related art: Registered Patent Publication No. 10-2158149 (Title of Invention: Channel Generation Method of Channel Simulator for Massive MIMO)
Literature 4 in related art: Registered Patent Publication No. 10-1606354 (Title of Invention: Calibration Method of Channel Simulator)
Literature 5 in related art: Patent Publication No. 10-2021-0089900 (Title of Invention: Method and Apparatus for Calibrating Phased Array Antenna)

SUMMARY

Technical Goals

The present disclosure was made to solve the above-described matters, and the present disclosure is for the purpose of providing a method and an apparatus for calibrating an array path of a beam forming test equipment for a base station that enables an interlock test related to beam forming between a base station and a test equipment by compensating distortion of the beam forming characteristics of the base station incidentally occurs due to a connection between the base station and the test equipment using a specific signal transmitted from a base station when test equipment such as a channel simulator is used to test beam forming of a base station.

Technical Solutions

According to a feature of the present disclosure for achieving the above matter, a method for calibrating array path of beam forming test equipment for base station is provided, which may include: operation (a) receiving a Synchronization Signal Block (SSB) signal $y_n(t)$ transmitted by a base station using a plurality of array antennas; operation (b) detecting the SSB signal $\acute{Y}_{i,n}$ by analyzing the received signal; operation (c) measuring characteristic $\tilde{H}_n$ of all array antenna paths of the base station by applying a known beam forming coefficient $W_{i,n}$ of the SSB signal to the SSB signal $\acute{Y}_{i,n}$ detected in operation (b); operation (d) calculating a compensation coefficient $C_n(=1/\tilde{H}_n)$ for compensating the path characteristic $\tilde{H}_n$ measured in operation (c); and operation (e) performing calibration on the received signal by applying the compensation coefficient $C_n$ calculated in operation (d), wherein i represents the index of a beam and n represents the index of an array antenna.

The path characteristic $\tilde{H}_n$ measured in operation (c) are calculated by $$\tilde{H}_n = \frac{\hat{Y}_n}{W_{i,n}}, \quad n = 0, 1, \ldots N-1,$$

and the path characteristic $\tilde{H}_n$ and the actual path characteristic $H_n$ are $$\tilde{H}_n \approx \frac{1}{S_i} \cdot H_n, \quad n = 0, 1, \ldots N-1$$

$$\begin{bmatrix} \tilde{H}_0 \\ \tilde{H}_1 \\ \vdots \\ \tilde{H}_{N-1} \end{bmatrix} \approx \frac{1}{S_i} \cdot \begin{bmatrix} H_0 \\ H_1 \\ \vdots \\ H_{N-1} \end{bmatrix},$$

and $S_i$ is a reference symbol of the SSB included in the i-th beam forming target signal $s_i(t)$.

Operations (d) and (e) are performed at the baseband end, or operation (d) is performed at the baseband end and operation (e) is performed at the RF end.

According to another feature of the present disclosure, an apparatus for calibrating array path of beam forming test equipment for base station is provided, which may include: a down converter for down-converting a SSB signal input through each of a plurality of array antenna ports while being distorted through a calibration target after being transmitted from a base station and converting the SSB signal into a baseband signal; an Analog to Digital (A/D) converter that converts the down-converted baseband SSB signal into a digital signal; a distortion compensation part having a SSB analyzer that measures the SSB signal for each array antenna port by applying the SSB index to the digital baseband SSB signal for each array antenna port, a compensation coefficient calculator that calculates a compensation coefficient by applying the corresponding beam forming coefficient to the SSB signal for each array antenna port measured through the SSB analyzer, and a complex number multiplier that performs a complex number multiplication operation for the compensation coefficient for each antenna port on the digital baseband SSB signal for each array antenna port that has passed through the A/D converter; a Digital to Analog (D/A) converter that converts a distortion-compensated digital baseband SSB signal to an analog signal through a complex multiplier; and an up-converter that up-converts the analog baseband SSB signal that has passed through the D/A converter and outputs a distortion-compensated RF signal.

According to another feature of the present disclosure, an apparatus for calibrating array path of beam forming test equipment for base station is provided, which may include: a down-converter for down-converting a SSB signal input through each of a plurality of array antenna ports while being distorted through a calibration target after being transmitted from a base station and converting the SSB signal into a baseband signal; an A/D converter that converts the down-converted baseband SSB signal into a digital signal; and a distortion compensation part having a SSB analyzer that measures the SSB signal for each array antenna port by applying the SSB index to the digital baseband SSB signal for each array antenna port, a compensation coefficient calculator for calculating a compensation coefficient by applying a corresponding beam forming coefficient to the SSB signal for each array antenna port measured by the SSB analyzer, an attenuator and a phase shifter respectively compensating for the amplitude distortion and phase distortion of the SSB signal input through each of the array antenna ports by the compensation coefficient calculated by the compensation coefficient calculator.

Effects

According to method and apparatus for calibrating array path of beam forming test equipment for base station of the present disclosure, when a test equipment such as a channel simulator is used for a beam forming test of a base station, by compensating for the distortion of the beam forming characteristics of the base station incidentally caused by the connection between the base station and the test equipment using a specific signal transmitted from the base station, it is supported to reliably perform interlocking tests related to beam forming between the base station and the test equipment.

DETAILED DESCRIPTION

Hereinafter, a preferred example embodiment of a method and apparatus for calibrating an array path of a beam forming test equipment for a base station of the present disclosure will be described in detail with reference to the accompanying drawings, and hereinafter, all variables representing a signal are complex variables represented by amplitude and phase components.

Figure 1:
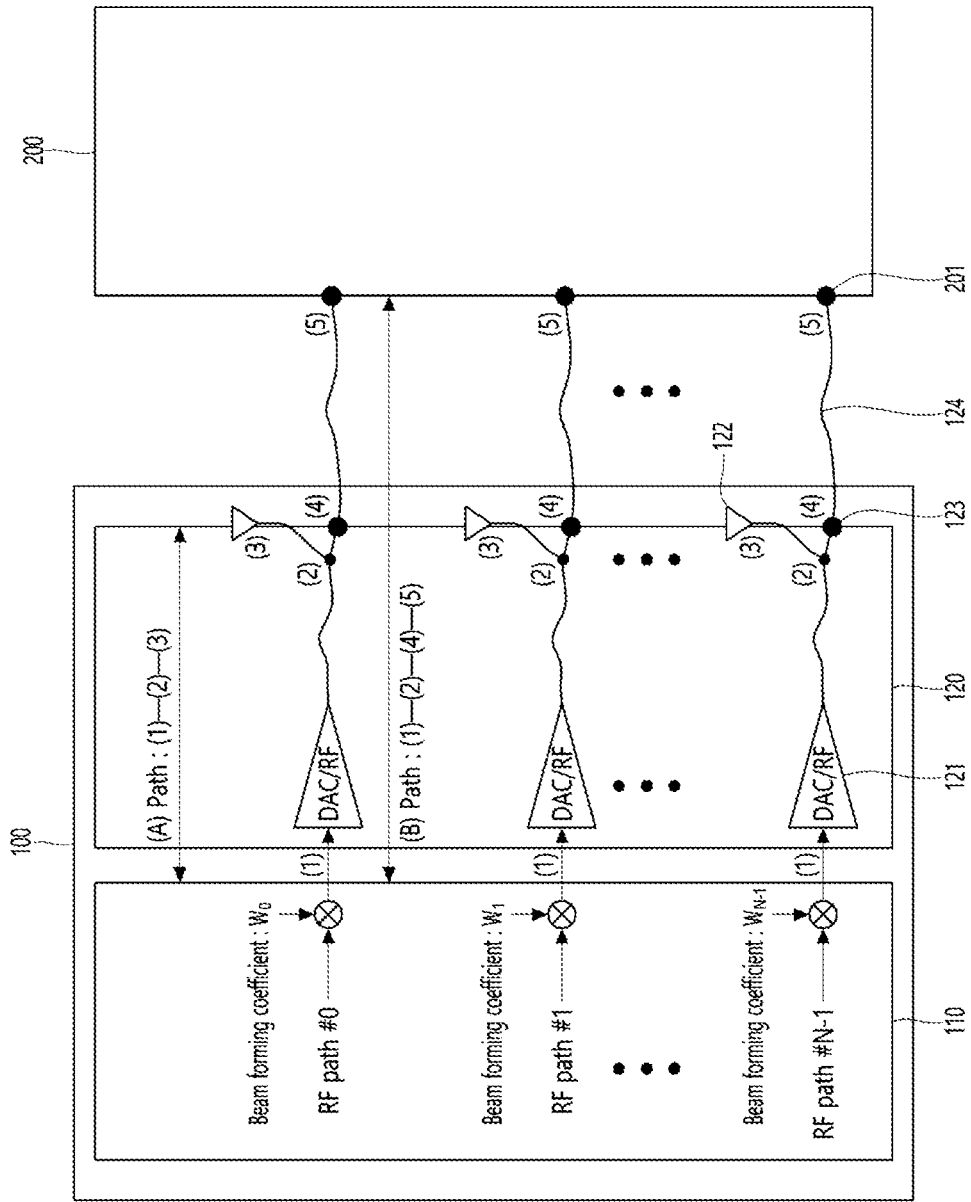
FIG. 1 is a diagram for explaining a calibration process of a base station employing a conventional beam forming technology.
Figure 2:
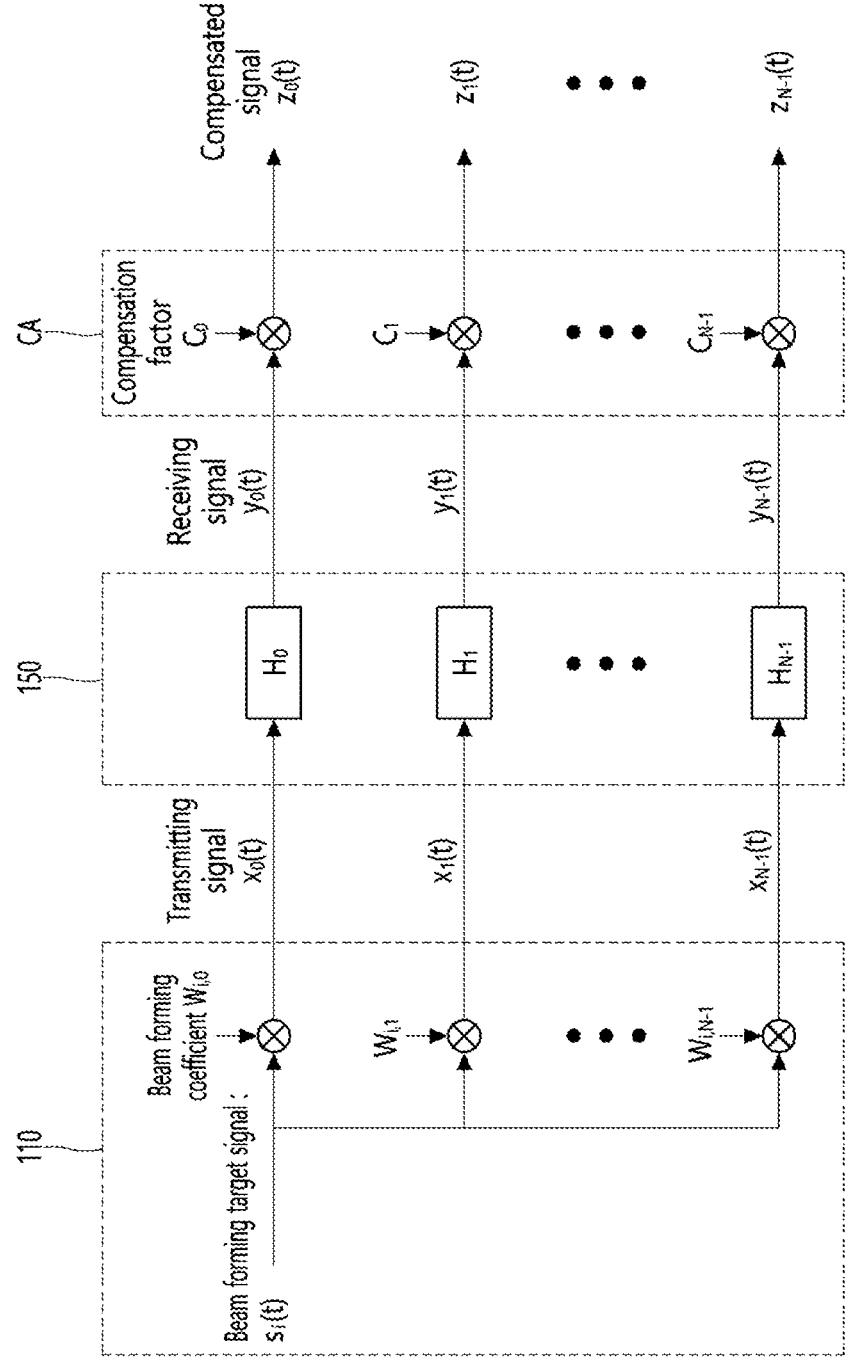
FIG. 2 is a diagram for explaining the operating principle of a method of calibrating an array path of a beam forming test equipment for a base station of the present disclosure.

FIG. 2 is a diagram for explaining the operating principle of the array path calibration method of the beam forming test equipment for a base station according to the present disclosure. As shown in FIG. 2, the DU 110 of the base station multiplies the target signal s(t) to be beam formed by the beam forming coefficient, $W_{i,n}$, and outputs $x_n(t)$ of Equation 1 below to which beam forming is applied.

$$x_n(t) = W_{i,n} \cdot s(t), n=0,1,\ldots N-1 \qquad \text{[Equation 1]}$$

In Equation 1, i represents the index of a beam. In fact, since the DU 110 of the base station has a plurality of beam formers, the outputs of each beam former are added and output to each array antenna, but, hereinafter, only one beam former will be described as an example to simplify the description.

Meanwhile, there is no concern if the base station output signal $x_n(t)$ is connected to beam forming measurement equipment, for example, the above-mentioned channel simulator, and the like, but as described above, in the connection process, a separate RF circuit, for example, a splitter and a calibration target 150 such as a cable, are connected for each array antenna path, so a signal $y_n(t)$ distorted by the path characteristic $H_n$ is received.

In view of this, an apparatus of calibrating an array path of a beam forming test equipment for a base station (CA) of the present disclosure may obtain a compensation coefficient $C_n$ for compensating for this distortion, and then applies it to obtain the distortion-compensated signal $z_n(t)$ as shown in Equation 2 below.

$$z_n(t)=C_n \cdot y_n(t), n=0,1,\ldots N-1 \quad \text{[Equation 2]}$$

Figure 3:
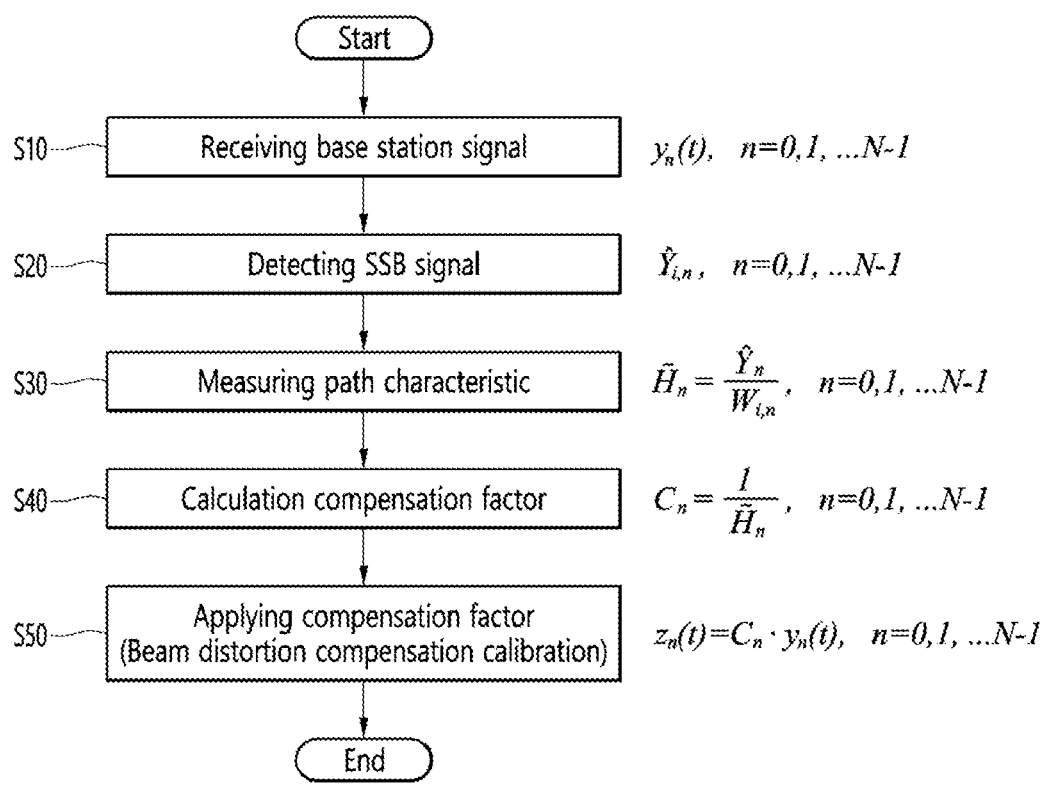
FIG. 3 is a flowchart illustrating a method of calibrating an array path of a beam forming test equipment for a base station according to the present disclosure.

FIG. 3 is a flowchart for explaining a method of calibrating an array path of a beam forming test equipment for a base station of the present disclosure, and in order to apply the calibration method proposed in the present disclosure, coefficient values for each antenna for one or more beams among beam forming coefficients of a base station transmission signal, for example, a base station synchronization signal block (SSB), must be known or provided from a base station user. Since the SSB signal transmitted by the 5G NR base station is defined in the 5 generation partnership project (GPP) standard and may be analyzed without special information, the SSB signal may be used as the base station transmission signal in the present disclosure.

Meanwhile, a base station uses a plurality of SSBs, and each SSB signal is multiplied by a different beam forming coefficient set and transmitted through an array antenna to form directivity in a propagation space. Since each SSB signal is allocated to different time intervals and is not temporally transmitted simultaneously, interference does not occur between the respective SSB signals.

When the base station transmits the i-th SSB signal, the i-th signal component $X_{i,n}$ included in the transmission signal $x_n(t)$ of each array antenna is expressed by Equation 3 below.

$$X_{i,n}=W_{i,n} \cdot S_i, n=0,1,\ldots N-1 \quad \text{[Equation 3]}$$

Here, $S_i$ represents a reference symbol of the SSB included in the i-th beam forming target signal $s_i(t)$, and $X_{i,n}$ represents a beam forming coefficient of an n-th antenna port for the i-th SSB.

The calibration method proposed in the present disclosure proceeds in the following process.

First, in operation S10, a signal passed through a calibration target 150, for example, a base station RF circuit and a cable, is received from a base station, and since the base station transmission signal is distorted by the characteristics of the base station RF circuit and cable, which are the calibration target 150, the SSB signal component included in the signal $y_n(t)$ received by the calibration apparatus CA may be shown as Equation 4 below.

$$Y_{i,n}=H_n \cdot W_{i,n} \cdot S_i, n=0,1,\ldots N-1 \quad \text{[Equation 4]}$$

Next, in operation S20, the calibration apparatus CA analyzes the received signal and extracts the SSB signal. Here, since the SSB signal may be analyzed by applying the technical details defined in the 5GPP standard, the SSB signal measured through the SSB analyzer is displayed as $\hat{Y}_{i,n}$ (however, n=0, 1, ..., N−1)(The SSB analyzer itself is not included in the scope of the present disclosure).

Next, in operation S30, the characteristics of all array antenna paths of the base station are measured by applying the base station beam forming coefficients and these path characteristics may be expressed as Equation 5 below.

$$H_n = \frac{Y_n}{W_{i,n} \cdot S_i}, \quad n=0,1,\ldots N-1 \quad \text{[Equation 5]}$$

Here, $W_{i,n}$ is a beam forming coefficient value of the i-th SSB known in advance and if $S_i$ is known, it may be used to measure path characteristics $H_n$ by substituting it into Equation 5, but since $S_i$ is the same value for all array antenna paths, it does not affect the beam forming test even if it is not reflected in the calculation. Therefore, in the method of the present disclosure, the measured value of the path characteristic $H_n$ is calculated by Equation 6 below.

$$\tilde{H}_n = \frac{\hat{Y}_n}{W_{i,n}}, \quad n=0,1,\ldots N-1 \quad \text{[Equation 6]}$$

The relationship between the measured value of path characteristic $\tilde{H}_n$ and the actual path characteristic value $H_n$ may be expressed as shown in Equation 7 below using Equations 5 and 6.

$$\tilde{H}_n \approx \frac{1}{S_i} \cdot H_n, \quad n=0,1,\ldots N-1 \quad \text{[Equation 7]}$$

$$\begin{bmatrix} \tilde{H}_0 \\ \tilde{H}_1 \\ \vdots \\ \tilde{H}_{N-1} \end{bmatrix} \approx \frac{1}{S_i} \cdot \begin{bmatrix} H_0 \\ H_1 \\ \vdots \\ H_{N-1} \end{bmatrix}$$

The reason why the equal sign is not used in Equation 7 is to reflect the measurement error.

Next, in operation S40, a compensation coefficient for compensating for path characteristics is calculated using the extracted SSB signal and this compensation coefficient may be calculated by Equation 8 below.

$$C_n = \frac{1}{\tilde{H}_n}, \quad n=0,1,\ldots N-1 \quad \text{[Equation 8]}$$

Finally, in operation S50, the distorted signal is compensated (calibrated) by reflecting the previously calculated compensation coefficient and a process of compensating for a signal distorted by a path characteristic is performed by multiplying a received signal by a compensation coefficient as shown in Equation 2 above.

When Equations 4, 7, and 8 are substituted into Equation 2, Equation 9 below is derived and, according to this, it may be seen that the calibration method of the present disclosure is effective because the path characteristic $H_n$ is canceled in the compensated signal.

$$z_n(t) = C_n \cdot y_n(t), \quad n = 0, 1, \ldots N-1 \quad \text{[Equation 9]}$$
$$\approx \frac{S_i}{H_n} \cdot H_n \cdot W_{i,n} \cdot s_i(t), \quad n = 0, 1, \ldots N-1$$
$$= S_i \cdot W_{i,n} \cdot s_i(t), \quad n = 0, 1, \ldots N-1$$

Figure 4:
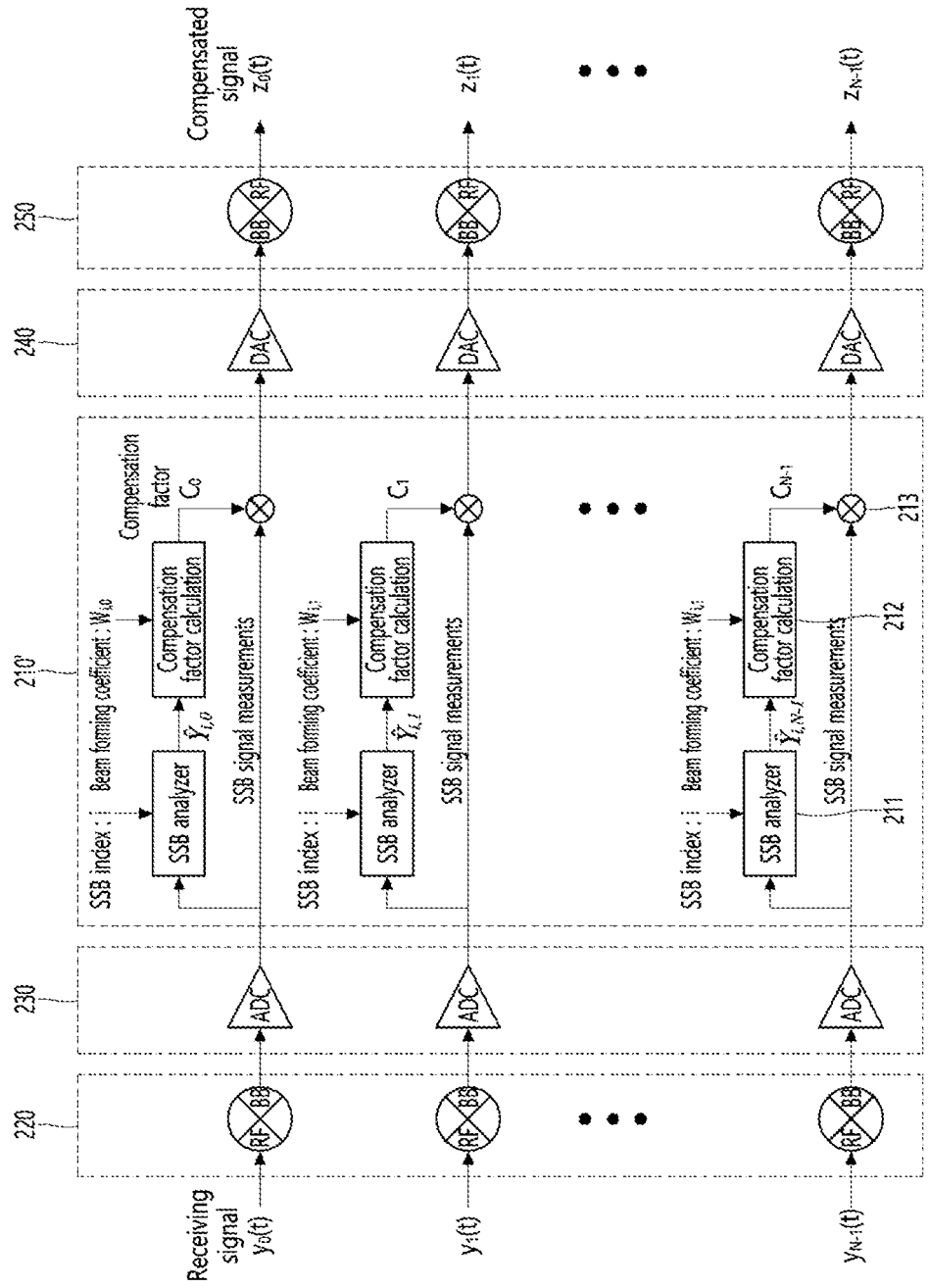
FIG. 4 is a block diagram of an apparatus of calibrating an array path of a beam forming test equipment for a base station according to an example embodiment of the present disclosure.

FIG. 4 is a block diagram of an apparatus of calibrating an array path of a beam forming test equipment for a base station according to an example embodiment of the present disclosure, and shows an example embodiment in which calibration is performed at the baseband end.

As shown in FIG. 4, an apparatus of calibrating an array path of a beam forming test equipment for a base station according to an example embodiment of the present disclosure may include: a down-converter 220 for down-converting a specific RF received signal, for example, a SSB signal $y_n(t)$ input through each of a plurality of array antenna ports while being distorted through a calibration target after being transmitted from the base station, and converting it into a baseband signal; an A/D converter 230 converting the down-converted baseband SSB signal into a digital signal; a distortion compensating part 210' having a SSB analyzer 211 for measuring the SSB signal $\hat{Y}_{i,n}$ for each array antenna port by applying the SSB index to the digital baseband SSB signal $Y_{i,n}$ for each array antenna port, a compensation coefficient calculator 212 for calculating a compensation coefficient $C_n$ by applying the corresponding beam forming coefficient $W_{i,n}$ to the SSB signal $\hat{Y}_{i,n}$ for each array antenna port measured by the SSB analyzer 211, and a complex number multiplier 213 for performing a complex number multiplication operation for the compensation coefficient $C_n$ for each antenna port to the digital baseband SSB signal $Y_{i,n}$ for each array antenna port that has passed through the A/D converter 230; a D/A converter 240 that converts the digital baseband SSB signal whose distortion has been compensated for through the complex number multiplier 213 into an analog signal; and an up-converter 250 that up-converts the analog baseband SSB signal that has passed through the D/A converter 240 to output a distortion-compensated RF signal $z_n(t)$.

Figure 5:
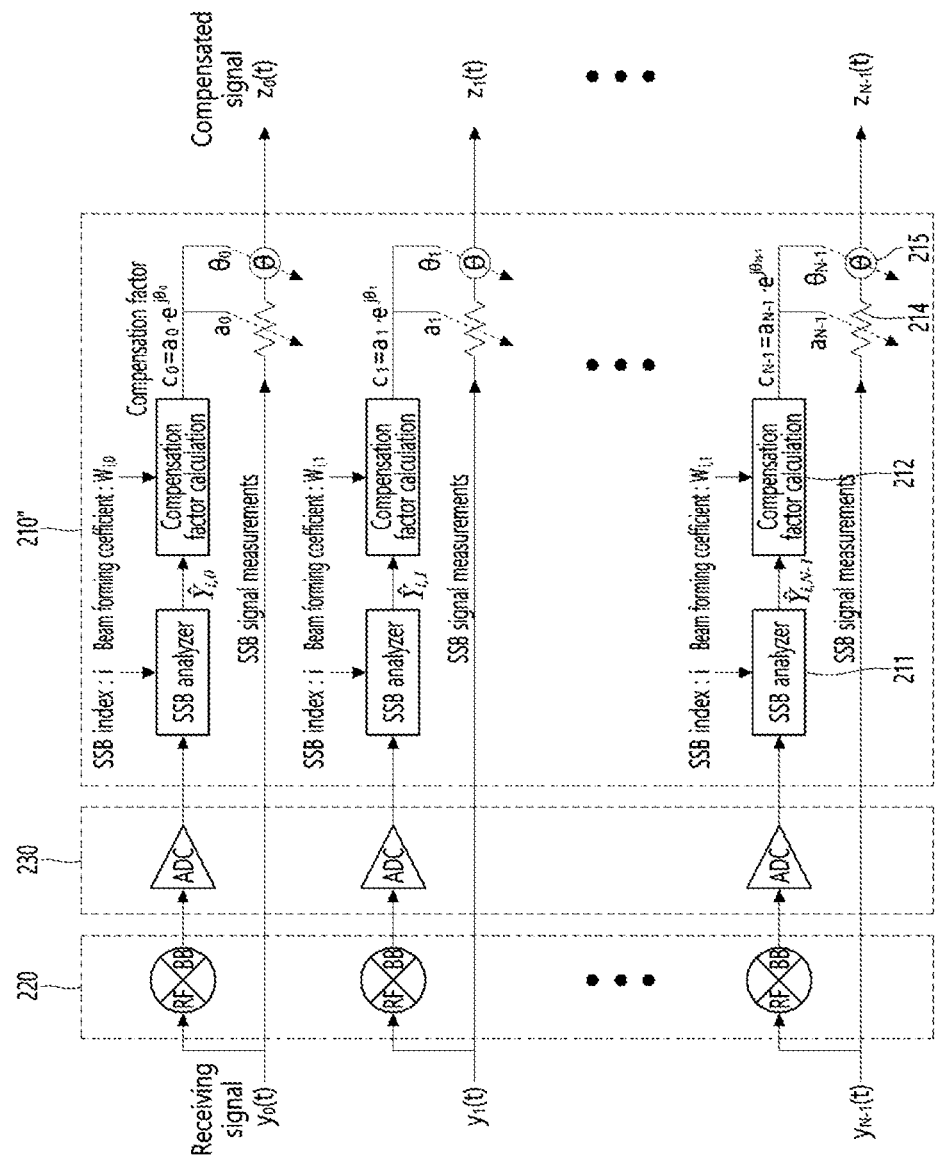
FIG. 5 is a block diagram of an apparatus of calibrating an array path of a beam forming test equipment for a base station according to another example embodiment of the present disclosure.

FIG. 5 is a block diagram of an apparatus of calibrating an array path of a beam forming test equipment for a base station according to another example embodiment of the present disclosure, showing an example embodiment in which calibration is performed at an RF end.

As shown in FIG. 5, an apparatus of calibrating an array path of a beam forming test equipment for a base station according to this example embodiment may include: a down-converter 220 for down-converting a specific RF received signal, for example, a SSB signal $y_n(t)$ input through each of a plurality of array antenna ports while being distorted through a calibration target after being transmitted from the base station, and converting it into a baseband signal; an A/D converter 230 converting the down-converted baseband SSB signal into a digital signal; and a distortion compensating part 210" having a SSB analyzer 211 for measuring the SSB signal $\hat{Y}_{i,n}$ for each array antenna port by applying the SSB index to the digital baseband SSB signal $Y_{i,n}$ for each array antenna port, a compensation coefficient calculator 212 for calculating a compensation coefficient $C_n$ by applying the corresponding beam forming coefficient $W_{i,n}$ to the SSB signal $\hat{Y}_{i,n}$ for each array antenna port measured by the SSB analyzer 211, and an attenuator and a phase shifter that compensate for amplitude distortion and phase distortion of the received signal, for example, the SSB signal $y_n(t)$, respectively, by the compensation coefficient $C_n$ calculated by the compensation coefficient calculator 212.

In the above configuration, the compensation coefficient $C_n$ may be expressed as a complex number or in polar coordinates as shown in Equation 10 below.

$$c_i = c_{real,i} + j \cdot c_{imaginary,i} = a_i \cdot e^{j\theta_i} \quad \text{[Equation 10]}$$

In Equation 10, $a_i$ is the amplitude distortion compensation coefficient of the i-th port, and $\theta_i$ is the phase distortion compensation coefficient of the i-th port.

The apparatus of calibrating an array path of a beam forming test equipment for a base station of FIGS. 4 and 5 may be configured independently or may be installed as part of a function in the beam forming test equipment for a base station, for example, a channel simulator.

Figure 6:
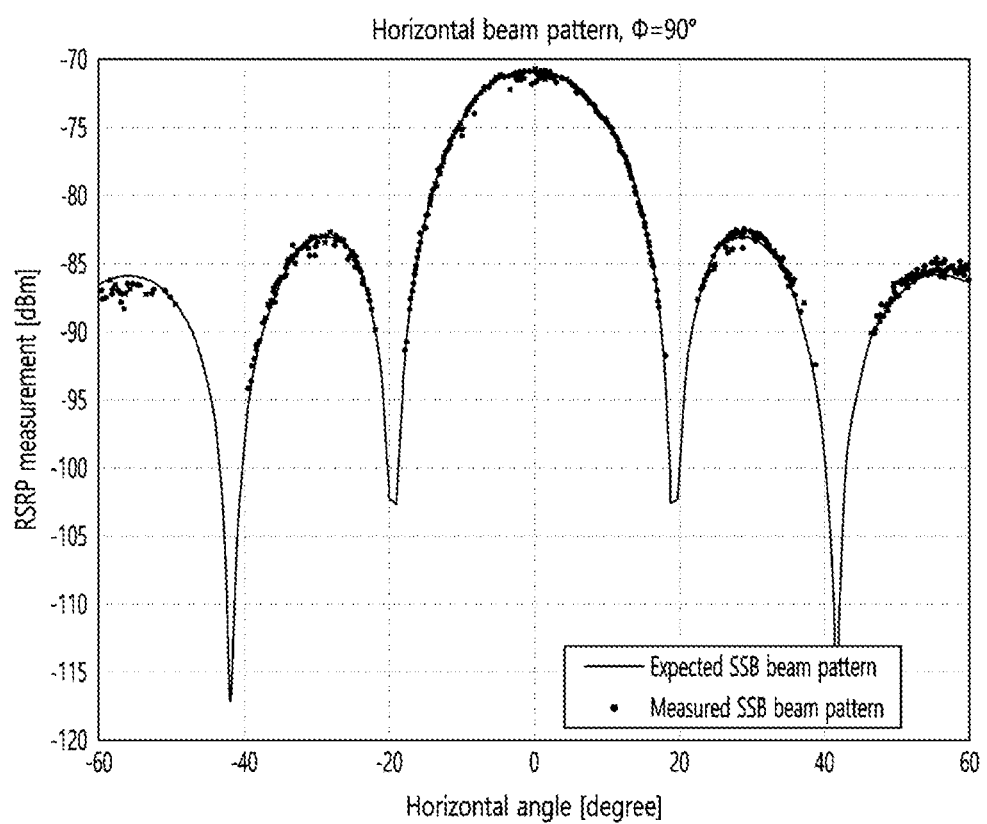
FIG. 6 is a graph showing the results of performing a beam pattern measurement test after calibration by a method of calibrating an array path of a beam forming test equipment for a base station of the present disclosure.

FIG. 6 is a graph showing the results of performing a beam pattern measurement test after calibration by a method of calibrating an array path of a beam forming test equipment for a base station of the present disclosure. The present applicant performed a real-time SSB beam pattern measurement test in a state in which a 5G NR base station and a 5G NR terminal were connected to a channel simulator manufactured by the applicant equipped with the calibration method of the present disclosure.

In this process, simulation was performed so that the terminal moved along an arc between −60 degrees and 60 degrees and, as shown in FIG. 6, it may be confirmed that the RSRP (Reference Signal Received Power) pattern of the front SSB beam measured by the terminal for each angle matches the SSB beam pattern transmitted by the base station (if calibration is not applied, the two patterns show unrelated shapes).

In the above, a preferred example embodiment of method and apparatus for calibrating array path of beam forming test equipment for base station of the present disclosure has been described in detail with reference to the accompanying drawings, but this is only an example, and various modifications and variations within the scope of the technical idea of the present disclosure may be possible. Therefore, the scope of the present disclosure may be determined by the description of the claims below.

For example, in this specification, singular forms also include plural forms unless specifically stated otherwise in a phrase. As used herein, "comprise" and/or "comprising" mean that a stated component, step, operation and/or element does not exclude the presence or addition of one or more other components, steps, operations and/or elements.

As used herein, "embodiments" and the like are not to be construed as indicating that any aspect or design described is preferred or advantageous over other aspects or designs.

Also, the term 'or' means an inclusive OR rather than an exclusive OR.

Unless otherwise defined, all terms (including technical and scientific terms) used in this specification may be used in a meaning commonly understood by those of ordinary skill in the art to which the present disclosure belongs. In addition, terms defined in commonly used dictionaries are not interpreted ideally or excessively unless specifically defined explicitly.

In addition, terms such as " . . . part" and " . . . unit" described in the specification refer to a unit that processes at least one function or operation, which may be implemented by hardware, software, or a combination of hardware and software.

| [Explanation of reference] | |
|---|---|
| 100: base station, | 110: DU (Digital Unit), |
| 120: RU (Radio Unit), | 121: DAC/RF amplifier, |
| 122: array antenna, | 123: array antenna port, |
| 124: connection cable, | 200: beam forming test equipment, |
| 201: input port, | 210', 210": distortion compensation part, |
| 211: SSB analyzer, | 212: compensation coefficient calculator, |
| 213: complex number multiplier, | 214: attenuator, |
| 215: phase shifter, | 220: down-converter, |
| 230: A/D converter, | 240: D/A converter, |
| 250: up-converter | |

What is claimed is:

1. A method for calibrating an array path of beam forming test equipment for a base station, the method comprising:
   (a) receiving a Synchronization Signal Block (SSB) signal $y_n(t)$ transmitted by a base station using a plurality of array antennas;
   (b) detecting a SSB signal $\hat{Y}_{i,n}$ by analyzing the SSB signal $y_n(t)$ received from the base station;
   (c) measuring a path characteristic $\tilde{H}_n$ of a path of each of the array antennas of the base station by applying a known beam forming coefficient $W_{i,n}$ of the SSB signal $y_n(t)$ to the SSB signal $\hat{Y}_{i,n}$ in detected in the (b) detecting;
   (d) calculating a compensation coefficient $C_n=(1/\tilde{H}_n)$ for compensating the path characteristic $\tilde{H}_n$ measured in the (c) measuring; and
   (e) performing a calibration on the SSB signal $y_n(t)$ received from the base station by applying the compensation coefficient $C_n$ calculated in the (d) calculating,
   wherein i represents an index of a beam and n represents an index of an array antenna.

2. The method of claim 1, characterized in that the path characteristics $\tilde{H}_n$, measured in the (c) measuring are each calculated by $$\tilde{H}_n = \frac{\hat{Y}_n}{W_{i,n}}, \quad n = 0, 1, \ldots N-1,$$

and the path characteristic $\tilde{H}_n$ and an actual path characteristic $H_n$ are $$\tilde{H}_n \approx \frac{1}{S_i} \cdot H_n, \quad n = 0, 1, \ldots N-1$$

$$\begin{bmatrix} \tilde{H}_0 \\ \tilde{H}_1 \\ \vdots \\ \tilde{H}_{N-1} \end{bmatrix} \approx \frac{1}{S_i} \cdot \begin{bmatrix} H_0 \\ H_1 \\ \vdots \\ H_{N-1} \end{bmatrix},$$

and
$S_i$ is a reference symbol of a SSB included in the i-th beam forming target signal $s_i(t)$.

3. The method of claim 2, characterized in that the (d) calculating and the (e) performing are performed at a baseband end.

4. The method of claim 2, characterized in that the (d) calculating is performed at a baseband end, and the (e) performing is performed at a radio frequency (RF) end.

5. An apparatus of calibrating an array path of a beam forming test equipment for a base station, the apparatus comprising:
   a down-converter for down-converting a Synchronization Signal Block (SSB) signal input through each of a plurality of array antenna ports while being distorted through a calibration target after being transmitted from the base station, and converting the SSB signal into a baseband signal;
   an analog-to-digital (A/D) converter converting the down-converted baseband SSB signal into a digital signal;
   a distortion compensating part having:
      a SSB analyzer for measuring the SSB signal for each of the array antenna ports by applying a SSB index to the digital baseband SSB signal for each of the array antenna ports,
      a compensation coefficient calculator for calculating a compensation coefficient by applying a corresponding beam forming coefficient to the SSB signal for each of the array antenna ports measured by the SSB analyzer, and
      a complex number multiplier for performing a complex number multiplication operation for a compensation coefficient for each of the antenna ports to the digital baseband SSB signal for each of the array antenna ports that has passed through the A/D converter;
   a digital-to-analog (D/A) converter that converts the digital baseband SSB signal whose distortion has been compensated for through the complex number multiplier into an analog baseband signal; and
   an up-converter that up-converts the analog baseband SSB signal that has passed through the D/A converter to output a distortion-compensated radio frequency (RF) signal.

6. An apparatus of calibrating an array path of a beam forming test equipment for a base station, the apparatus comprising:
   a down-converter for down-converting a Synchronization Signal Block (SSB) signal input through each of a plurality of array antenna ports while being distorted through a calibration target after being transmitted from the base station, and converting the SSB signal into a baseband signal;
   an analog-to-digital (A/D) converter converting the down-converted baseband SSB signal into a digital signal; and
   a distortion compensating part having:
      a SSB analyzer for measuring the SSB signal for each of the array antenna ports by applying a SSB index to the digital baseband SSB signal for each of the array antenna ports, a compensation coefficient calculator for calculating a compensation coefficient by applying a corresponding beam forming coefficient to the SSB signal for each of the array antenna ports measured by the SSB analyzer, and
      an attenuator and a phase shifter that compensate for amplitude distortion and phase distortion of the SSB signal, respectively, input through each of the array antenna ports by the compensation coefficient calculated by the compensation coefficient calculator.

* * * * *